Figure 1:
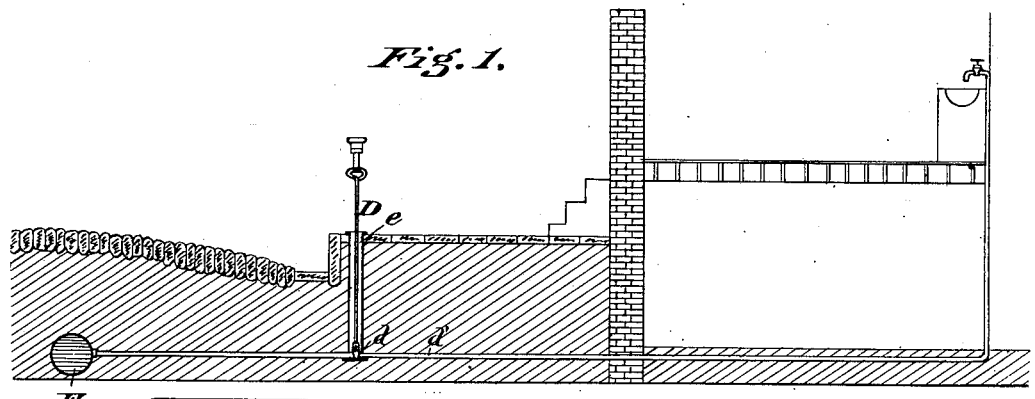

(No Model.)

T. J. BELL.
METHOD OF AND APPARATUS FOR DETECTING LEAKAGE IN CONDUITS.

No. 267,825. Patented Nov. 21, 1882.

Attest
J. Wm. Strehli.
E. R. Hill.

Inventor
Thomas J. Bell
per Wm. Hubbell Fisher,
Atty

UNITED STATES PATENT OFFICE.

THOMAS J. BELL, OF CINCINNATI, OHIO.

METHOD OF AND APPARATUS FOR DETECTING LEAKAGE IN CONDUITS.

SPECIFICATION forming part of Letters Patent No. 267,825, dated November 21, 1882.

Application filed January 3, 1882. (No model.)

*To all whom it may concern:*

Be it known that I, THOMAS J. BELL, of the city of Cincinnati, Hamilton county, and State of Ohio, have invented a new and useful Method of and Apparatus for Detecting Leakage in Conduits, of which the following is a specification.

My invention relates to a method of and apparatus for detecting leaks in conduits, with reference more particularly to the underground service-pipes used in cities for conveying water through the streets and houses. Such pipes, being laid in sections with numerous joints concealed from sight, are extremely liable to injuries from settling of the ground and other causes, by which the joints are opened or the pipes broken, while the water apparatus in buildings is also liable to injury from similar causes, and to leakage from careless and improvident use of the same.

The object of my invention is to enable leaks to be detected in otherwise inaccessible places in such pipes with a view to repairs in the same, and the correction of abuses in the use of water privileges.

In carrying out my invention I avail myself of the well-known conductivity of continuous lines of metal—such as water-pipes—for sound vibrations, the escape of water under pressure from mains or service-pipes producing a sound more or less distinct, according to the head or pressure of water, the size of the leak-orifice, and the distance of the same from the point of observation—that is, the length of pipe through which the sound is conducted. I have found that by the employment of apparatus suitably constructed for concentrating and amplifying the sound-vibrations thus transmitted through the pipes from the point of escape leaks of even a minute character may be ascertained and located with accuracy. For the purpose of more efficiently carrying out my invention I have devised an apparatus for this purpose, which is hereinafter described.

By my invention I am enabled to detect leaks in the service-pipes of buildings without entering the same, and in the street-mains without having to resort to expensive excavations for this purpose, thus obviously conducing to the more efficient and economical administration of the water-supply of cities. It may also be applied with advantge to gas-mains where the same conditions exist as already described.

My invention consists, therefore, primarily in the method of ascertaining and locating leaks in service-pipes for water, gas, &c., in cities and towns, by amplifying and rendering perceptible the transmitted sound-vibrations caused by the escape of fluids under pressure.

It consists, further, in the employment, as a means of ascertaining and locating leaks in underground pipes used for water, gas, &c., of a sound-conducting rod or its equivalent, to be applied to such pipes at convenient points, and a sound-amplifying instrument for detecting sound-vibrations conducted from the leakage-point.

It consists, further, in the instrument, hereinafter described, adapted to be applied to water and gas mains, and the like, for concentrating and amplifying the sound-vibrations due to leakage, whereby they are rendered audible.

My invention is illustrated in the drawings accompanying this specification, showing a form of apparatus such as I have referred to.

Figure 2:
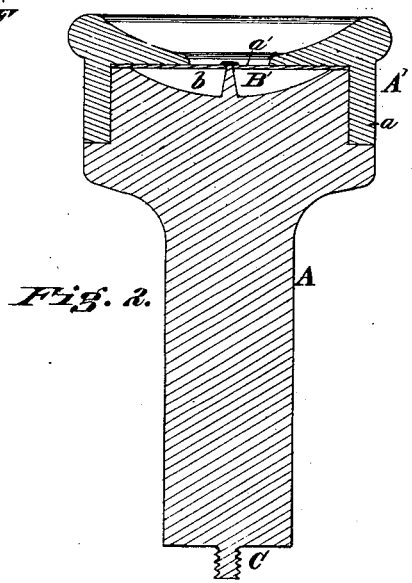
Figure 3:
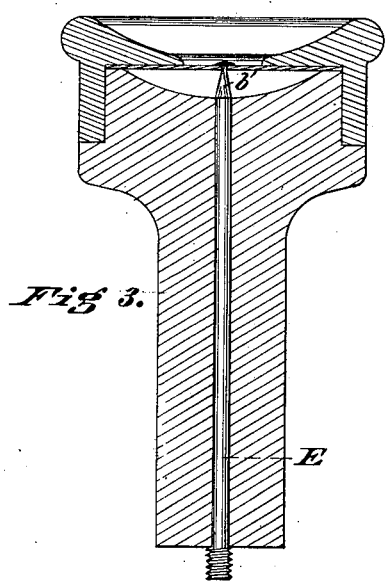
Figure 4:
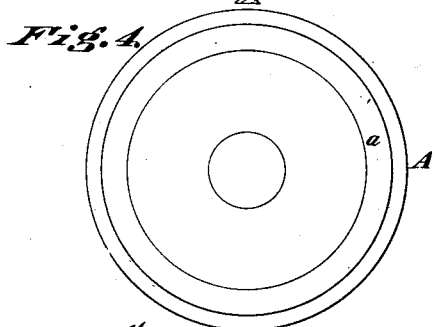
Figure 5:
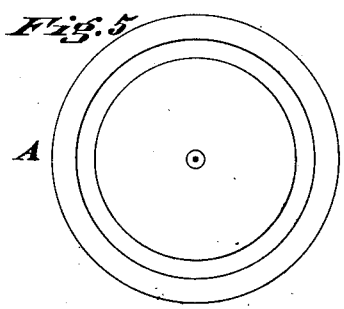

In these drawings, Figure 1 represents my apparatus as applied to an underground water-main by means of a rod or key used to turn the stop-cock. Figs. 2 and 3 are central longitudinal sections through my leak-detecting apparatus, exhibiting two forms of construction. Fig. 4 is an end view of the body of the apparatus, and Fig. 5 represents the lower face of the cap of the apparatus.

My invention may be effectuated by any form of apparatus having the functions of a "microphone" and adapted to amplify the sound-vibrations transmitted through the pipes and render the same perceptible to the senses. The form of apparatus which I have devised for this purpose, and which is illustrated in the drawings, consists essentially of a metal diaphragm mounted centrally upon a metallic support in a chamber to which the ear can be conveniently applied.

The device as constructed consists of a body portion, A, of metal or other suitable material, and a cap, A', constituting the cover of the sound-chamber. The cap A' is of hard rubber or other suitable material, and is provided with an annular flange, a, by which it is attached to the body A, and has its upper surface concave, as shown, and is perforated, as shown at a', for convenient application to the ear. The corresponding upper portion of the body-piece A is hollowed out to form, with the cap A', which fits over it, as shown, a chamber, b, in which, upon a stud, b', projecting upward centrally from the body-piece A, is mounted a thin metal diaphragm, B. At the extreme lower end of the body-piece A projects a screw-threaded lug, C, which affords a means of attaching the apparatus to the rod or key D, which latter is the implement employed to manipulate the stop-cock d, beneath the surface of the ground, in the pipe d'. When the body-piece A is wholly of metal the stud b' and the lug C are preferably made as part of the body, as shown in Fig. 2; but when the body-piece is of wood or other material having a lower degree of conductivity for sound than metal a metallic rod, E, is inserted longitudinally through the body, the upper end constituting the stud b' for supporting the diaphragm, and the lower end threaded as a substitute for the lug C, as shown in Fig. 3.

The most convenient use of my apparatus in detecting leaks in water-mains is as follows: A rod or the ordinary key, D, is inserted into the usual opening or box, e, in the street, provided for access to the stop-cock d in the pipe d', leading from the street-main F into the house. The rod or key D being fitted upon the plug of the stop-cock and the microphonic apparatus, before described, being attached to the rod or key D by means of its screw-lug C, as shown in Fig. 1, a connection for the transmission of sound-vibrations is thus established between the apparatus and the water-pipe, when, by placing the ear at the opening a' in the cap A', the sound-vibrations, caused by the escaping water, or by the passage of water through the pipe on its way to the place of leakage, may be distinguished, these vibrations being transmitted through the pipes and rod to the apparatus described, where they are converted into amplified atmospheric vibrations by means of the diaphragm, and thus rendered audible. It will be readily understood that the vibrations due to such leakage will become more and more perceptible as the actual locality of the leak is approached; and it will be obvious, therefore, that by testing at various consecutive points where means of access to the pipes—such as the boxes e—exist the locality of the leak will readily be discovered.

I have, for the purpose of illustration, shown the microphonic apparatus as applied to the service-pipes by means of and in connection with the ordinary turn-key, D, used to manipulate the stop-cock at the usual sidewalk-box or opening provided for access to the service-pipe leading from a street-main to a building; but it will be obvious that any suitable conductor of sound vibrations may be employed—such as a wire, rod, &c.—connecting the pipe with the apparatus. I do not therefore confine myself to the method of use shown, as all others are within the spirit of my invention which utilize the sound conductivity of the pipes and extend the same to the converting apparatus; nor do I wish to confine myself to the particular form or construction of microphonic apparatus described, as many other forms of apparatus may be devised which will effectuate the principles of my invention.

Having described my invention, I claim and desire to secure by Letters Patent—

1. The method of ascertaining and locating leaks or improper use of water in service mains and pipes in cities and buildings, consisting in receiving, amplifying, and converting the molecular vibrations induced in such pipes by the escaping water, and conveying the same to the ear by means of suitable microphonic apparatus applied to such mains or pipes, substantially as set forth.

2. The microphonic apparatus consisting essentially of a metallic diaphragm centrally mounted upon a stud or transmitting-rod in a sound-chamber, and adapted to be applied to water or gas mains for the detection of leaks, substantially as set forth.

3. The herein-described leak-detector, consisting of a body-piece, A, provided with a stud, b', and lug C, cap-piece A', having an opening, a', and a diaphragm, B, mounted in the chamber formed by the cap and body-piece, substantially as specified.

4. The combination of the body-piece A, cap A', stud B', and metal diaphragm B, placed between the cap and the body, substantially as set forth.

5. An apparatus for transmitting the sounds of leakage in fluid-conduits to the ear of an attendant or inspector, consisting of the microphonic leak-detector A and the key D, the latter adapted to be applied to the cock of the service-pipe, substantially as set forth.

THOMAS J. BELL.

Witnesses:
E. R. HILL,
O. P. CAYLOR.